(12) United States Patent
Keh et al.

(10) Patent No.: US 7,609,426 B2
(45) Date of Patent: Oct. 27, 2009

(54) IMAGE SCANNING APPARATUS

(75) Inventors: Yong-Chan Keh, Suwon-si (KR);
Mun-Kue Park, Suwon-si (KR);
Byeong-Hoon Park, Yongin-si (KR)

(73) Assignee: Samsung Electronics Co., Ltd.,
Yeongtong-Gu, Suwon-Si, Gyeonggi-Do (KR)

( * ) Notice: Subject to any disclaimer, the term of this patent is extended or adjusted under 35 U.S.C. 154(b) by 466 days.

(21) Appl. No.: 11/646,738

(22) Filed: Dec. 28, 2006

(65) Prior Publication Data

US 2007/0177241 A1   Aug. 2, 2007

(30) Foreign Application Priority Data

Feb. 1, 2006   (KR) ............... 10-2006-0009706

(51) Int. Cl.
*G02B 26/08*   (2006.01)

(52) U.S. Cl. .............. 359/198.1; 359/199.2; 359/199.3; 359/200.6; 359/200.7; 250/208.1; 235/462.32

(58) Field of Classification Search ............ None
See application file for complete search history.

(56) References Cited

FOREIGN PATENT DOCUMENTS

| JP | 63-113513 | 5/1988 |
|---|---|---|
| JP | 02-211417 | 8/1990 |
| KR | 2005-73533 | 7/2005 |
| KR | 2005-109030 | 11/2005 |

*Primary Examiner*—James Phan
(74) *Attorney, Agent, or Firm*—Cha & Reiter, LLC

(57) ABSTRACT

An image scanning apparatus for embodying an image using visible lights apparatus includes a scanning unit for irradiating line scan light; a power source for generating voltage for driving the scanning unit; a light detector for detecting duty that is a variation ratio of line scan light with respect to time; and a servo-loop for comparing the detected duty with a preset value, calculating a magnitude of the voltage for driving the scanning unit, and applying voltage, which is controlled depending on the calculated voltage magnitude, to the scanning unit.

5 Claims, 3 Drawing Sheets

IMAGE SCANNING APPARATUS

CLAIM OF PRIORITY

This application claims priority under 35 U.S.C. § 119 to an application entitled "Image Scanning Apparatus," filed in the Korean Intellectual Property Office on Feb. 1, 2006 and assigned Ser. No. 2006-9706, the contents of which are incorporated herein by reference.

BACKGROUND OF THE INVENTION

1. Field of the Invention

The present invention relates generally to an image scanning apparatus using laser light, and in particular, to an image scanning apparatus utilizing a line scan or spot scan method.

2. Description of the Related Art

In an image scanning apparatus for embodying an image on a screen, lights emitted from light sources for generating visible lights having wavelength bandwidths different from each other are irradiated in a line pattern to the screen through a scanning mirror. The scanning mirror can employ a rotational polygon mirror, a galvanometer mirror, and a micro electromechanical system (MEMS) mirror. The scanning mirror performs a plurality of line scans or spot scans repeatedly within a predetermined viewing angle range, thereby embodying the image on the screen. However, there can be a drawback in that an optical device, such as a general scanning mirror, is out of a viewing angle range due to external environmental causes such as temperature change and aging. To address this, a projection image apparatus typically includes various monitoring units for monitoring the viewing angle range of the scanning mirror.

A servo-loop monitoring unit using a position sensor and a monitoring unit using a galvanometer are available as monitoring units, in which a position signal is detected using varying capacitance depending on the motor rotation in order to control a motor driving signal.

In the servo-loop monitoring unit, after the position signal detected using the position sensor is converted into an electrical signal, the electrical signal is fed back to an actuator, which is a driver of the scanning mirror, thereby controlling and performing the exact scan within a desired viewing angle.

Meanwhile, the position sensor employs an electrostatic combo driver or a piezoelectric device sensor. In the electrostatic combo driver, capacitance variation generated from a combo structure when a MEMS mirror rotates around a hinge is converted into an electrical signal, and the electrical signal is fed back to the scanning mirror, thereby controlling the position. The piezoelectric device sensor employing a piezoelectric device has been made public in Journal of Micro electro mechanical systems, Vol. 11, No. 4, 2002, P.355.

However, there is a drawback in that the position sensor for monitoring the viewing angle range can only be used in a combo driving actuator. Further, if the combo capacitance is decreased due to the increase in the scan angle, a capacitance signal gets smaller, thereby not obtaining an exact measurement value. In other words, the capacitance based monitoring unit has a problem in that the viewing angle range of the scanning mirror is limited.

Furthermore, a monitoring unit using a piezoelectric resistor uses materials formed through a process in which ion impurities are added to a portion of a silicon wafer. As a result, the resistance may be varied depending on temperature. Accordingly, a bridge circuit must be additionally provided to minimize resistance variation affected by the temperature.

SUMMARY OF THE INVENTION

The present invention provides an image scanning apparatus for monitoring a viewing angle of a scanning mirror, in which a monitored range is wide, and a viewing angle range of the scanning mirror is unlimitedly monitored.

One aspect of the present invention to provide an image scanning apparatus for monitoring a viewing angle of a scanning mirror that is independent of temperature.

In one embodiment, there is provided an image scanning apparatus for embodying an image using visible lights. The apparatus includes: a scanning unit for irradiating line scan light; a power source for generating voltage for driving the scanning unit; a light detector for detecting duty that is a variation ratio of line scan light with respect to time; and a servo-loop for comparing the detected duty with a preset value, calculating a magnitude of the voltage for driving the scanning unit, and applying voltage, which is controlled depending on the calculated voltage magnitude, to the scanning unit.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Figure 1:
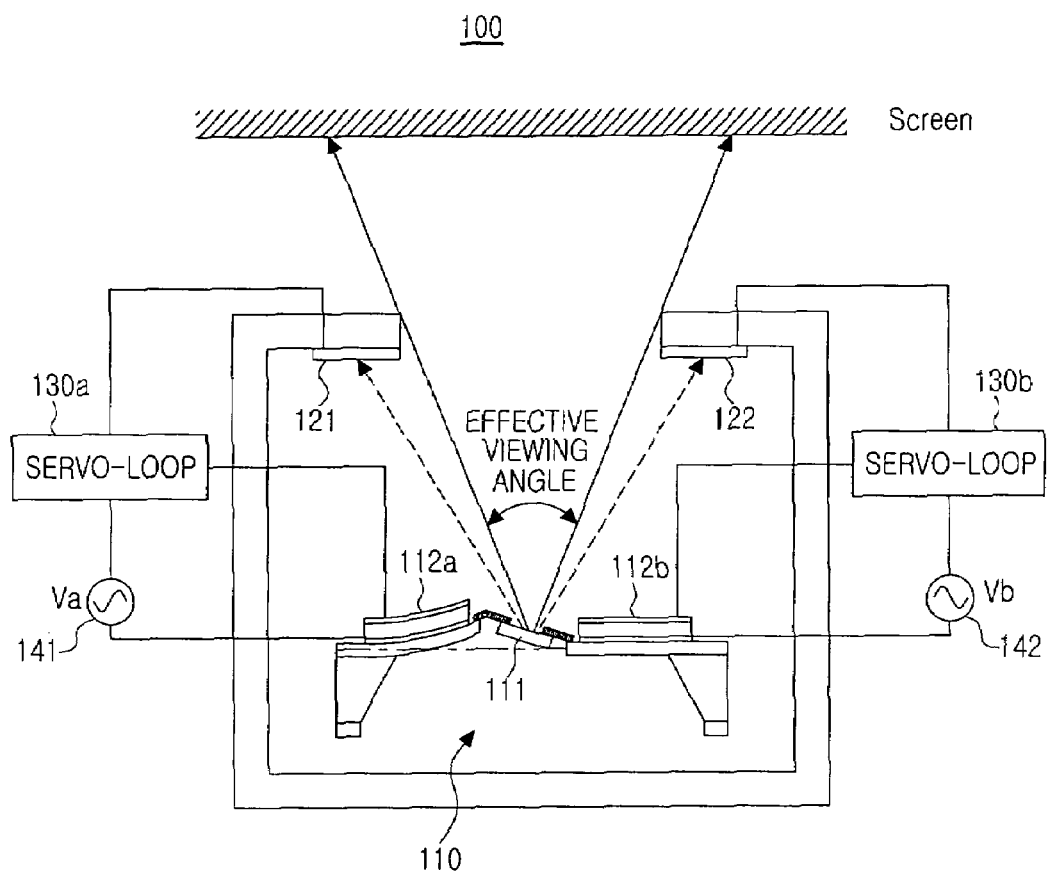
FIG. 1 illustrates an image scanning apparatus for monitoring a viewing angle range of a scanning mirror according to an embodiment of the present invention.

An embodiment of the present invention will now be described in detail with reference to the annexed drawings. In the drawings, the same or similar elements are denoted by the same reference numerals even though they are depicted in different drawings. For the purposes of clarity and, a detailed description of known functions and configurations incorporated herein has been omitted for conciseness.

FIG. 1 illustrates an image scanning apparatus for monitoring a viewing angle range of a scanning mirror according to an exemplary embodiment of the present invention. As shown, the image scanning apparatus 100 includes a scanning unit 110 for irradiating scan light; power sources 141 and 142 for generating voltage for driving the scanning unit 110; light detectors 121 and 122 for detecting duty that is a variation ratio of line scan light with respect to time; and servo-loops 130a and 130b for calculating a magnitude of the voltage necessary for driving the scanning unit 110, controlling a magnitude of the voltage (generated in the power sources 141 and 142, and applying the controlled voltage to the scanning unit 110.

The scanning unit 110 includes a MEMS mirror 111, and drivers 112a and 112b for driving the MEMS mirror 111 to irradiate the line scan light within a preset range. The drivers 112a and 112b can employ an electrostatic type or piezoelectric driving type actuator or a magnetostriction actuator. The drivers 112a and 112b generate a mechanical displacement caused by the voltage of a sine wave periodically inverted in phase, and transmit the generated mechanical displacement to the MEMS mirror 111. In other words, the piezoelectric driving type actuator generates the mechanical displacement that is in proportion to the applied voltage, and the MEMS mirror 111 periodically scans incident visible lights within a preset scan viewing angle range (dotted line) using the voltage-proportional mechanical displacements of the drivers 112a and 112b. For example, when voltage (Va) is applied from the power source 141 to the driver 112a, the driver 112a is shrunk, thereby inclining the MEMS mirror 111 clockwise. The MEMS mirror 111 inclined clockwise by the driver 112a scans the line scan light toward the light detector 122 positioned on the right. The light detector 122 detects the incident line scan light in a scan viewing angle range. The left light detector 121 is enabled in the same manner. The power sources 141 and 142 alternately perform the same operation on the left (Va) and the right (Vb) during one frame for which the line scan light is one time scanned in the scan viewing angle range.

The viewing angle of the MEMS mirror 11 can be distinguished as an effective viewing angle (solid-line arrow) and a scan viewing angle (dotted-line arrow). The effective viewing angle can be defined as an angle range for allowing the line scan light scanned from the MEMS mirror 11 to embody an image on a screen. The scan viewing angle, a maximal angle range in which the MEMS mirror 11 scans, can be defined as a larger angle than the effective viewing angle. The effective viewing angle can be decided by a structural feature of the image scanning apparatus 10, such as an aperture size or a distance from the screen.

The light detectors 121 and 122 are positioned such that their portions are included in the scan viewing angle between the effective viewing angle and the scan viewing angle. The line scan light scanned from the MEMS mirror 111 out of the effective viewing angle within the scan viewing angle range is detected using a duty pulse signal that is photoelectric current. The light detectors 121 and 122 feed back the detected duty pulse signal to the server-loops 130a and 130b.

Figures 2A, 2B:
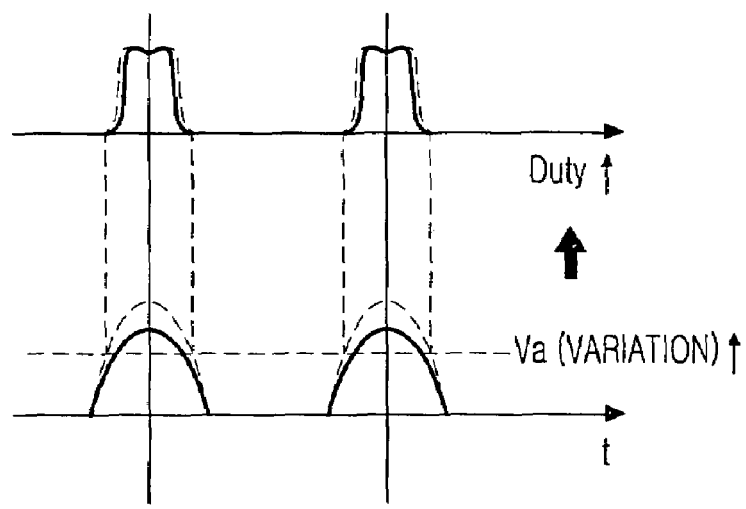
FIGS. 2A to 2B are graphs illustrating an operation for monitoring a viewing angle range of a micro electromechanical system (MEMS) mirror of FIG. 1.

FIGS. 2A to 2B are graphs illustrating a relationship between the duty signal of one period during which the line scan light is scanned in the scan viewing angle range, and the voltages applied to the drivers 112a and 112b. FIG. 2A shows variation of the duty detected in the respective light detectors 121 and 122. FIG. 2B shows variation of the voltage applied to the respective drivers 112a and 112b depending on the duty variation. In FIG. 2A, a dotted line represents increased duty, and a solid line represents duty detected at a reference scan viewing angle. In FIG. 2B, a solid line represents a magnitude of the voltages applied to the drivers 112a and 112b in case where the duty is detected at the reference scan viewing angle, and a dotted line represents a magnitude of the voltages applied to the drivers 112a and 112b in case where the duty is out of a reference scan viewing angle range.

Accordingly, when the voltages applied to the drivers 112a and 112b are increased, the scan viewing angle of the MEMS mirror 111 is increased, and the magnitude of the time-dependent line scan light incident on the light detectors 121 and 122 is accumulated, thereby increasing the duty signal. In contrast, when the voltages applied to the respective drivers 112a and 112b are decreased, the scan viewing angle of the MEMS mirror 111 is decreased, and the duty signals detected in the light detectors 121 and 122 are also decreased. In other words, in a photoelectric current off state where the duty signals cannot be detected by the light detectors 121 and 122, the line scan light is scanned in the effective viewing angle range, and the image is scanned on the screen.

Figure 3:
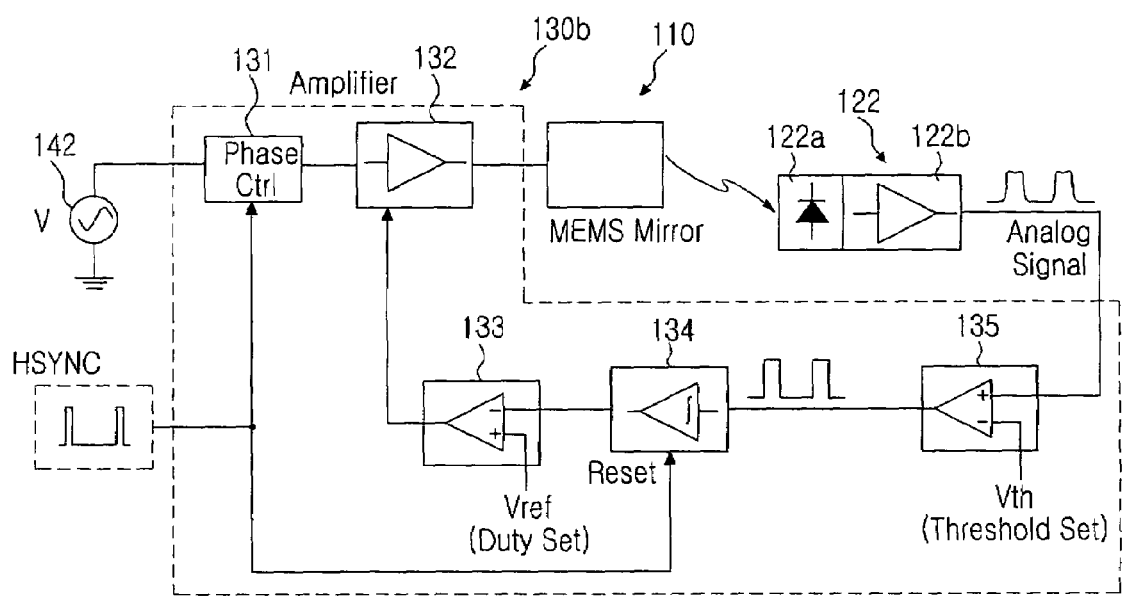
FIG. 3 is a block diagram illustrating a servo-loop of FIG. 2.

The servo-loops 130a and 130b compare the viewing angle range of the MEMS mirror 111 with the preset scan viewing angle range using the duties fed back from the respective light detectors 121 and 122 and, upon occurrence of error, they control and compensate the error. FIG. 3 is a block diagram illustrating the servo-loop of FIG. 1. Referring to FIG. 3, the servo-loop 130b includes a digital converter 135 for digitally converting the duty detected in the light detector 122; an integrator 134 for converting the digitally converted duty into a direct current duty; an arithmetic unit 133 for comparing the direct current duty with a preset reference duty, calculating the error of the viewing angle range of the line scan light scanned by the scanning unit 110, and outputting a control signal for compensating the calculated error; a phase controller 131 for controlling the phase of an input voltage depending on the control signal; and an amplifier 132.

The light detector 122 detects the line scan light scanned in the scanning unit 110, as the pulse duty of a photoelectric current form, converts the detected line scan light into voltage, and outputs the converted line scan light to the digital converter 135. Each of the light detectors 121 and 122 can include a photo diode 122a for feeding back the detected duty pulse signal to the servo-loops 130a and 130b, and an amplifier 122b for amplifying the duty signal detected in the photo diode 122a.

The digital converter 135 removes direct current (DC) offset caused by dark current, and converts an analog duty inputted from the light detector 122 into a digital duty. The integrator 134 converts the duty converted in the digital converter 135 from a pulse form to a DC form. The servo-loop 130b resets the integrator 134 using a HSYNC signal in every frame in order to prevent the integrator 134 from being saturated by a positive duty. The arithmetic unit 133 generates a control signal, which is obtained by comparing the voltage difference between a reference duty corresponding to a preset reference scan viewing angle range and the duty inputted from the integrator 134, and feeds back the generated control signal to the voltage for driving the scanning unit 110.

The amplifier 132 can employ a variable gain amplifier. The amplifier 132 controls the gain of a direct current voltage level having a sine wave form applied by the control signal and outputs the controlled gain to the scanning unit 110. The phase controller 131 is positioned between the power source 142 and the amplifier 132 and controls synchronization between the voltage and the HSYNC signal, so that one frame can start at a maximal point of the sine wave. In addition to the sine wave, the voltage can employ a waveform such as a square wave, a triangular wave, and a saw-tooth wave (ramp).

The present invention can directly monitor the position of the scanned light using the light detector, thereby monitoring the measurable viewing angle range without limit. In a conventional image scanning apparatus which monitors the viewing angle range of the scanning mirror using a transducer, such as a variable capacitance or piezoelectric resistance element, a physical value converted to measure the viewing angle range shows a nonlinear characteristic. On contrary, in the present invention, the position of the scanned light can be directly monitored, thereby monitoring the viewing angle range of the scanning mirror even without additionally compensating for a nonlinear characteristic.

Accordingly, in the present invention, there is an advantage in that, since the light detector can be positioned at a desired position, the measurable viewing angle range is unlimited. Further, the duty has a linear characteristic depending on variation of the viewing angle and does not need to use a nonlinear transducer. Furthermore, the present invention can remove the temperature-dependent dark current of the light detector by using the digital servo-loop, and can reduce the degree of noise sensitivity by controlling a threshold set caused by the dark current. It should be noted that the present invention is applicable to various image scanning apparatuses without rein to the actuator.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An image scanning apparatus for embodying an image using a visible light, comprising:
   a scanning unit for irradiating a line scan light;
   a power source for generating a voltage for driving the scanning unit;
   a light detector for detecting a variation ratio of the line scan light with respect to time; and
   a servo-loop for comparing the detected variation ratio with a preset value, calculating a magnitude of the voltage for driving the scanning unit, and applying voltage, which is controlled depending on the calculated voltage magnitude, to the scanning unit.

2. The apparatus of claim 1, wherein the scanning unit comprises:
   a micro electromechanical system (MEMS) mirror for irradiating the visible light as the line scan light; and
   a driver for controlling the MEMS mirror to irradiate the line scan light.

3. The apparatus of claim 2, wherein the driver comprises an electrostatic, a piezoelectric driving type actuator or a magnetostriction actuator.

4. The apparatus of claim 1, wherein the light detector comprises a photo diode for detecting the variation ratio of the irradiated line scan light with respect to time.

5. The apparatus of claim 1, wherein the servo-loop comprises:
   a digital converter for digitally converting the variation ratio detected in the light detector;
   an integrator for converting the digitally converted variation ratio into direct current duty;
   an arithmetic unit for comparing the converted direct current variation ratio with a preset reference duty, calculating an error of a viewing angle range of the line scan light irradiated from the scanning unit, and outputting a control signal for compensating the error;
   a phase controller for controlling a phase of input voltage depending on the control signal; and
   an amplifier for amplifying a voltage applied from the phase controller and transmitting the amplified voltage to the MEMS mirror.

* * * * *